No. 803,120. PATENTED OCT. 31, 1905.
R. W. LYLE.
CONDUIT SECTION FOR MANHOLE TERMINALS.
APPLICATION FILED JAN. 13, 1903. RENEWED AUG. 4, 1905.
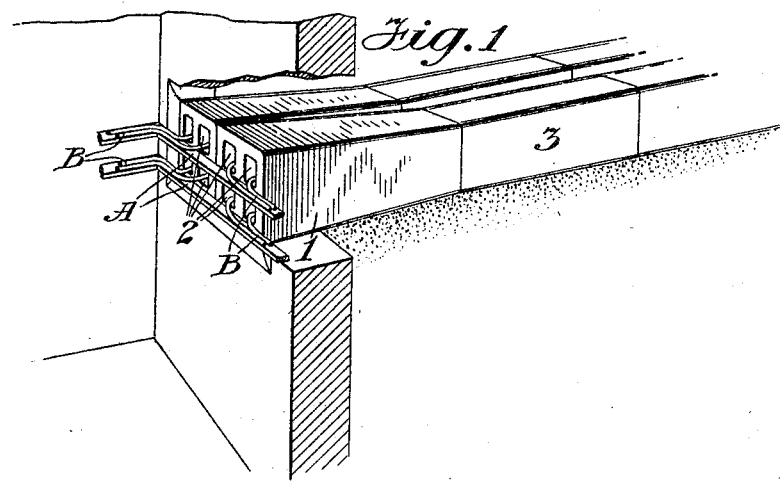
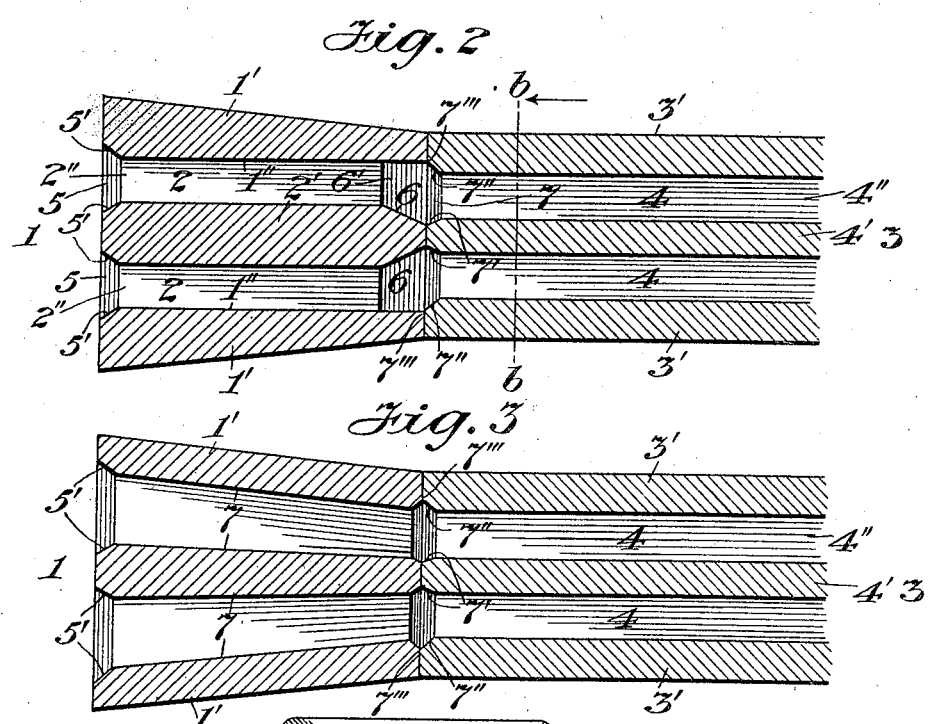
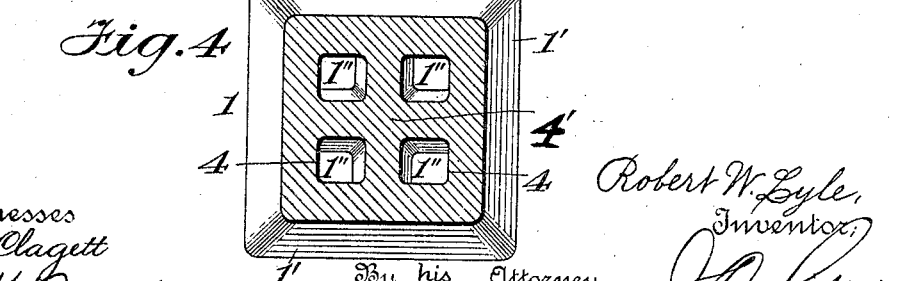
Witnesses
Chas. F. Clagett
Chas. H. Davids.
Robert W. Lyle,
Inventor,
By his Attorney,
J. P. Littell

UNITED STATES PATENT OFFICE.

ROBERT W. LYLE, OF NEW YORK, N. Y.

CONDUIT-SECTION FOR MANHOLE-TERMINALS.

No. 803,120.　　　　　Specification of Letters Patent.　　　　Patented Oct. 31, 1905.

Application filed January 13, 1903. Renewed August 4, 1905. Serial No. 272,793.

*To all whom it may concern:*

Be it known that I, ROBERT W. LYLE, a citizen of the United States, and a resident of New York, in the county and State of New York, have invented certain new and useful Improvements in Conduit-Sections for Manhole-Terminals, of which the following is a specification.

My present invention pertains to conduits in which certain sections specifically designed as terminals have their ducts opening directly into the chambers of manholes. Where a plurality of cables or other conductors are laid in a conduit which has terminal sections of the forms hitherto commonly in use, and therefore not specifically adapted to the purpose hereinafter related, great difficulty is experienced in properly separating the cables or other conductors to a sufficient distance to insure absolute freedom from contact one by another when they are flexed transversely of the ends of their containing-sections in order to properly position them—as, for instance, in a manhole-chamber. Such separation and consequent freedom from the possibility of contact one by another are nevertheless absolutely essential in order to avoid any possibility of establishing short circuits of the electric currents carried by the cables, for it is frequently the case that said currents exceed eight hundred kilowatts of energy, and the amount of possible injury or damage which might be done to persons or to the plant by reason of such short-circuiting of such currents cannot be overrated. Therefore conduit-sections which simply conform to the requirements of line construction—that is to say, to contain the cables in the required plurality of ducts which are divided by partition-walls—do not meet the specific requirements of terminal sections, as there is not sufficient space on the end faces of their partition-walls to admit shelves or other suitable supports for the cables led from the ducts and also to allow to each cable the space necessary to properly separate it from the other cables which are led from the same section.

By my invention provision is made for allowing to each one of a plurality of cables all the space which it may require for the before-specified purposes. Shelves or other supports may be attached to the end faces of all or any of the walls of my improved terminal sections, and therefore a plant equipped with the latter may confidently be considered absolutely safe and free from all danger from the short-circuiting of currents caused by accidental contacts at the ends of said terminal sections. Incidentally also the partition-walls of my improved terminal sections have a greater weight-sustaining capacity than that of the walls of interposed or line sections if both the former and the latter be made of the same material, which preferably is vitrified clay.

In the drawings, Figure 1 is an elevation in perspective of a part of each of two lines of conduits with terminal sections embodying my invention and communicating with a manhole-chamber, a part of the chamber-walls, shelves, cables, and other elements which do not form a part of my invention being also shown therein. Fig. 2 is a vertical longitudinal section of a terminal conduit-section which embodies a form of my invention and of a part of a contacting section. Fig. 3 is a similar view to Fig. 2, but showing a structural modification; and Fig. 4 is a vertical transverse section through the line $b\ b$, Fig. 2, looking to the left.

Corresponding parts in all the figures are denoted by the same reference characters.

Referring to the drawings, 1 designates a terminal conduit-section tapered from end to end, the outer end being the thicker and having in the form shown inclosing walls 1' 1' and four ducts 2 2, which are formed longitudinally of said section 1, the ducts 2 being separated by partition-walls 2' 2''. A contacting section 3 has inclosing walls 3' 3' and ducts 4 4, which are divided by partition-walls 4' 4'', which, as shown herein, are located on planes parallel with the inner faces of the walls 2' 2'' of the section 1, and, as shown herein, the ducts 2 and 4 are transversely dimensionally equal, though the transverse dimensions of the ducts in the different sections may be varied to suit particular requirements. The angles formed by the several end faces and inner faces of the sections 1 and 3, as shown herein, are beveled, as at 5, 5', 6, 6', 7, 7', and 7'', respectively. The walls 2' and 2'' are thicker than the walls 4 and 4' and lead to the latter by means of the beveled faces 6, 6', 7, and 7', respectively. In order to maintain the required transverse dimensions for the ducts 2 therefore, the inner faces 1'' 1'' of the inclosing walls 1' lead directly from the plane, which, as the sections are shown herein, is horizontal, of the outer angles 7''' of the ducts 4.

In the modified construction shown in Fig. 3 the inner ends of each duct 2 are in registry with the ducts 4 of the conduit-section, but diverge as they approach the outer end of the terminal section. They are also shown as increasing in area and with the outer walls as of uniform thickness, although these features may be varied at will.

The construction and advantages of my invention will be readily understood by those skilled in the art to which it appertains. By constructing terminal conduit-sections 1 with thick partition-walls, such as 2' and 2'', provision is made for attaching the shelves A (shown in Fig. 1) to the end faces of said section, so that the cables B (also shown in Fig. 1) may be properly separated, as hereinbefore related. The external form of my improved terminal sections is such that the latter may be laid in masonry or otherwise in the same manner as the ordinary sections are laid, the facility of the operation being in no wise impaired by said form. It should be noted also that the particular form of the section 1 also peculiarly facilitates the connection with said section, as at the larger end face thereof, as shown in the drawings, of separate conduit-sections for each several duct 2, this advantage being due to the greater thickness of the partition-walls 2' and 2'' of said section 1, as it is evident that separate connecting-sections, which may have inclosing walls of a thickness quite equal to one-half of that of the partition-walls 2' and 2'', may lead from the section 1 with their respective ducts in perfect registration with the ducts 2 2, the arrangement thus described being wholly impossible with separate sections which have walls of the relative thickness mentioned and which it may be desired to use to lead from sections—such, for instance, as the interposed or line section 3 shown herein, which may have partition-walls simply adapted to the specific requirements of interposed or line sections.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly fall within the scope of my invention and the terms of the following claims.

Having thus described my invention, I claim and desire to secure by Letters Patent—

1. A terminal section for electrical conduits comprising a section having a plurality of ducts therein each at their outer ends spaced farther from each other than the ducts of the conduit-sections employed therewith and at their inner ends drawn inward to register with the ducts of the conduit-sections, the relative arrangement of the duct-openings at the ends of said terminal section, with relation to the cross-sectional plane of said section, being identical at each end of the section.

2. A terminal section for electrical conduits having a plurality of ducts grouped about a center, said ducts at their inner ends being adapted to match with the ducts of the ordinary conduit-section and at their outer ends being farther removed from the center of the section, the relative arrangement of the duct-openings at the ends of said terminal section, with relation to the cross-sectional plane of said section, being identical at each end of the section.

3. A multiple-duct terminal section for electrical conduits having a partition between the ducts at the end designed to join with the conduit of substantially the same thickness as the partitions of the conduit-sections, said partitions at the outer end of the section being of a greater thickness and the relative arrangement of the duct-openings at the ends of said terminal section, with relation to the cross-sectional plane of said section, being identical at each end of the section.

4. A multiple-duct terminal section for electrical conduits having the partitions between the ducts at one end of greater thickness than at the other and the relative arrangement of the duct-openings at the ends of said terminal section, with relation to the cross-sectional plane of said section, being identical at each end of the section.

5. A multiple-duct terminal section for electrical conduits having the partitions between the ducts at one end of greater thickness than at the other end, the grouping of the ducts being alike at each end.

6. A multiple-duct terminal section for electrical conduits having the duct-openings spaced farther from the center at the outer than at the inner ends thereof, the outer ends of said ducts being flaring or bell-mouthed and the relative arrangement of the duct-openings at the ends of said terminal section, with relation to the cross-sectional plane of said section, being identical at each end of the section.

7. As an improved article of manufacture, a terminal section for electrical conduits, having a plurality of ducts extending therethrough, the position of the duct-openings at the front end of said section being spread so that they are separated by a relatively wide partition forming a relatively wide surface area between the duct-openings, and the position of the duct-openings at the rear end of said section being contracted with relation to the spread position at the front end so that they will register with the ducts of a normal adjoining conduit-section, the relative arrangement of the duct-openings at the ends of said terminal section, with relation to the cross-sectional plane of said section, being identical at each end of the section, substantially as and for the purpose set forth.

8. As an improved article of manufacture, a terminal section for electrical conduits, having a plurality of ducts extending therethrough and provided at its front end with a spread or extended partition-surface between the duct-openings, the relative arrangement of the duct-openings at the ends of said terminal section, with relation to the cross-sectional plane of said section, being identical at each end of the section, substantially as and for the purpose set forth.

In testimony whereof I have signed my name in the presence of the subscribing witnesses.

ROBERT W. LYLE.

Witnesses:
 W. J. BURKE,
 CHAS. H. DAVIDS.